(No Model.)

A. M. KENDALL.
CAR BRAKE.

No. 404,005. Patented May 28, 1889.

Witnesses,
Edwin W. Kendall
Fred H. Kendall

Inventor:
Amos M. Kendall

UNITED STATES PATENT OFFICE.

AMOS M. KENDALL, OF SIOUX CITY, IOWA.

CAR-BRAKE.

SPECIFICATION forming part of Letters Patent No. 404,005, dated May 28, 1889.

Application filed August 6, 1888. Serial No. 282,106. (No model.)

*To all whom it may concern:*

Be it known that I, AMOS M. KENDALL, a citizen of the United States, residing at Sioux City, in the county of Woodbury and State of Iowa, have invented a new and useful Brake to be Used on Railroad-Cars, of which the following is a specification.

The objects attained are speed in operating and durability combined with power without too great exertion or danger to the man operating the same. These are obtained by my invention, as shown by the accompanying drawings.

Figure 1:
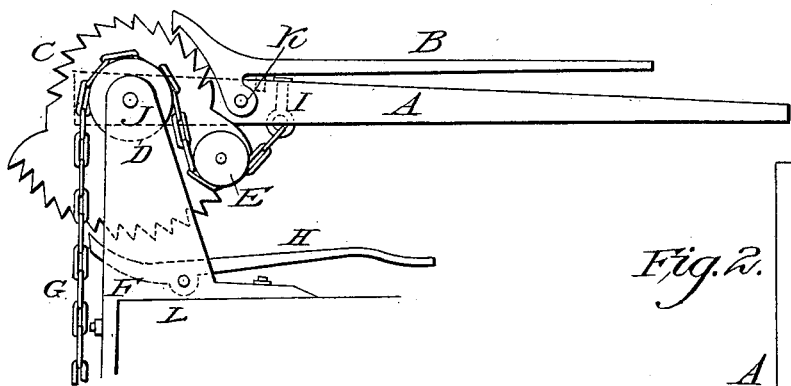
Figure 3:
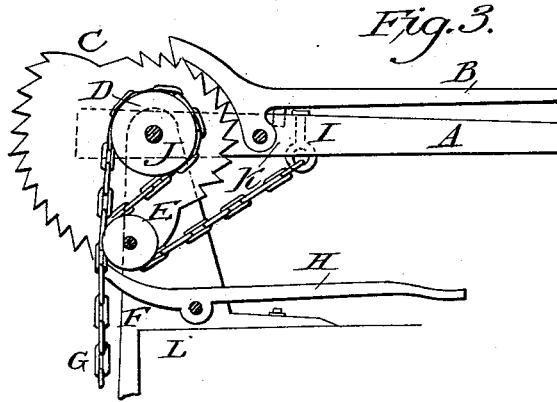
Figure 2:
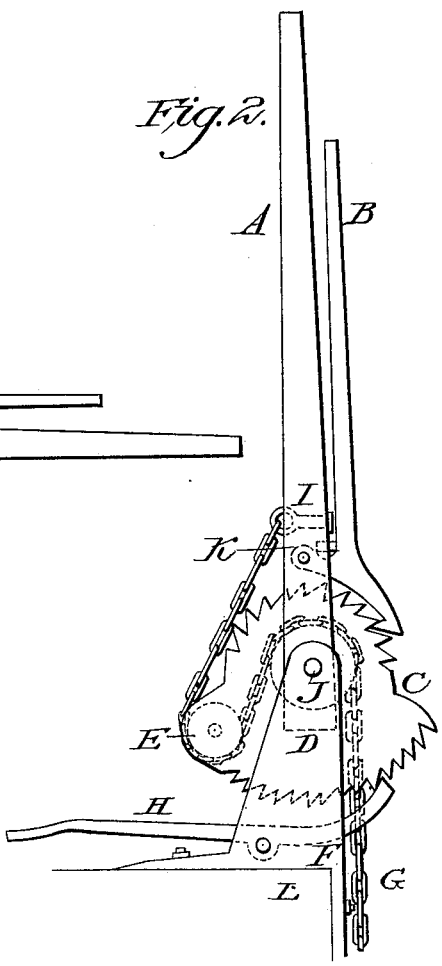

Figure 1 shows the position of the brake when not in use. Fig. 2 shows the reverse side of the brake with lever raised. Fig. 3 shows a vertical section with lever down and brake applied.

The lever A, as shown in Fig. 1, is attached to shaft J with loose bearings, which allows it to be raised or lowered freely.

B is a pawl with short lever, and is attached to A with a bolt.

C is a ratchet-wheel containing two half-circles of different dimensions, the smaller above and the larger below, which is also attached to shaft J with loose bearings.

D is a pulley grooved for chain G to pass over, with shaft J passing through it, on which it revolves.

E is also a grooved pulley, and is attached to ratchet-wheel C with gudgeon or bearing, which allows it to revolve on its own axle, and is also moved in a circle by the action of ratchet-wheel C.

F F are standards which support the whole mechanism and attach it to the car L.

G is the chain which attaches the machine to the brake under the car and communicates the power to the same.

H is a pawl to be operated with the foot.

I is the point where the chain G is attached to lever A.

J is a shaft.

K is a small rubber spring to press pawl B into notches in ratchet-wheel C.

The operation is performed by raising the lever toward a perpendicular position. The pawl H, being pressed into the notches in the ratchet-wheel C by the foot or of its own weight, keeps the ratchet-wheel C from turning. The chain G, being fastened to lever A at I and passing under pulley E and over pulley D and then down to brake underneath the car, is drawn upward by the raising of the lever. While the relative positions of the ratchet-wheel C and the pulleys D and E are maintained by the pawl H the pawl B glides over the ratchet-wheel C, and the slack of the chain and brake are taken up as the distance from I to E increases, as shown in Fig. 2, the lever being raised until the slack is taken up. The lever is then pressed downward, the pawl B being pressed by spring K into the notches in the ratchet-wheel C, causing it to revolve with the lever A toward the position shown in Fig. 3. The pawls H and B will hold the brake in any position required. To let off the brake, raise the pawl H with the foot until it is disengaged from the notches in ratchet-wheel C; then raise the lever A to position shown in Fig. 2; then let pawl H into notches in ratchet; press small lever B toward lever A until the pawl is free from notches in ratchet; then lower the lever, as shown in Fig. 1.

The object in reducing the circle on the upper half of ratchet-wheel C is to bring the brake as low as possible, so as to be used on high cars. In ordinary switching it will only be necessary to raise the lever, which will give as much power as any old-style brake; but for quick powerful work, raise the lever and bring it down, as hereinbefore described.

What I claim as my invention, and desire to secure by Letters Patent, is—

The combination, with the lever A, ratchet-wheel C, and grooved pulley D, all being attached to shaft J with loose bearings, so as to revolve independent of each other, of pawl B, rubber spring K, grooved pulley E, attached by loose bearings to ratchet-wheel C, chain G, secured to lever A, supported by uprights F F, together with pawl H, the mechanism so arranged that by the lever being raised the slack of the chain and brake are taken up, and by a downward pressure of the lever increased power is produced to set brake, substantially as described, and herein set forth.

AMOS M. KENDALL.

Witnesses:
FRED H. KENDALL,
EDWIN W. KENDALL.